Patented Feb. 14, 1928.

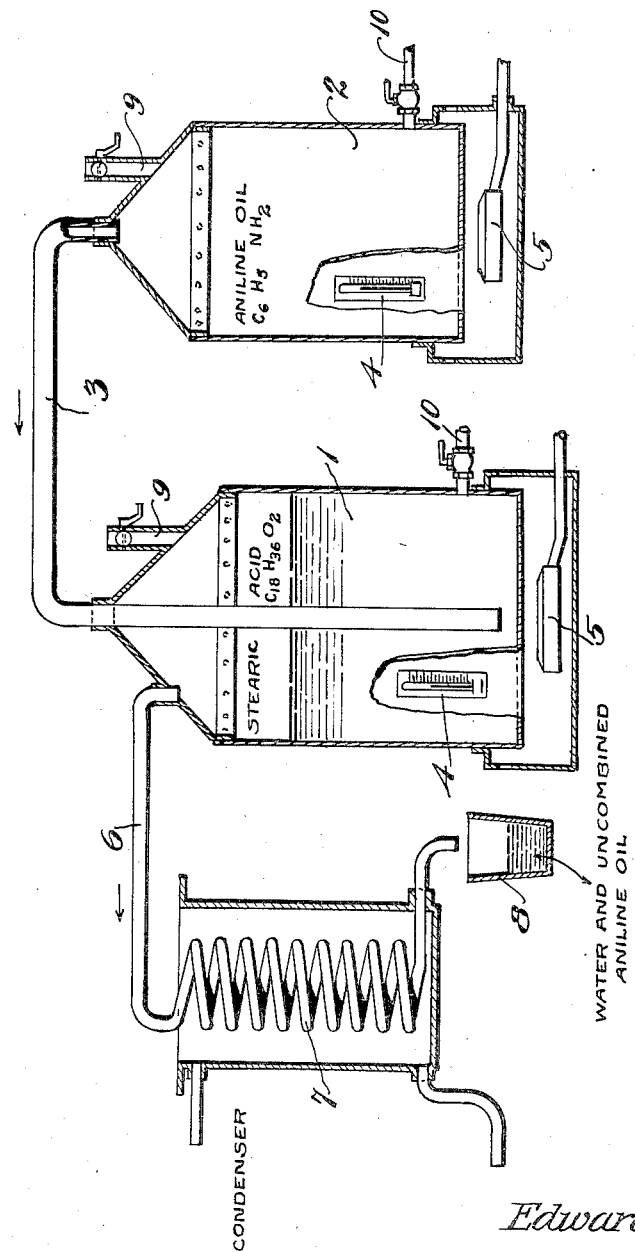

1,659,150

UNITED STATES PATENT OFFICE.

EDWARD A. NILL, OF CLEVELAND, OHIO, ASSIGNOR OF ONE-THIRD TO FREDERICK C. ACKER, OF CLEVELAND HEIGHTS, OHIO, AND ONE-THIRD TO JAMES R. DALL, OF NORWALK, OHIO.

PROCESS OF MAKING ANILIDES.

Original application filed May 4, 1923, Serial No. 636,639. Divided and this application filed May 10, 1924. Serial No. 712,392.

The present invention appertains to the manufacture of anilides and is a division of my co-pending application for a non-saponifiable oil and wax compound, Serial No. 636,639, which was filed on May 4, 1923.

Anilides are formed by the union of a fatty acid with aniline oil, according to a reaction similar to that given as follows which is for the specific combination of stearic acid and aniline oil.

Stearic acid. Aniline oil. Stearanilide. Water.

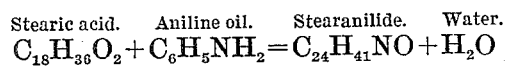

$$C_{18}H_{36}O_2 + C_6H_5NH_2 = C_{24}H_{41}NO + H_2O$$

I have found that it is extremely difficult or practically impossible to effect the union of stearic acid with aniline oil to form stearanilide in quantitative yields by merely mixing the two substances and heating them, as the aniline oil boils or distills at a temperature much below that to which the acid must be heated for a free chemical union of the substances and under the high temperatures necessary to effect this union one molecule of water is given off for every molecule of stearanilide formed. Furthermore, aniline is of a poisonous nature, so that it is necessary to form the union in a closed vessel, and just merely boiling the stearic acid with the quantitative amount of aniline oil at the boiling point of aniline oil will not suffice to bring the two substances into chemical union in sufficient quantities for practical yields. Besides the formation and condensation of water causes a considerable amount of agitation within the vessel so that the process cannot be controlled without the mass continually boiling over.

The foregoing difficulties of heating the fatty acid and the aniline together to a temperature sufficient to cause reaction without causing the distillation of the aniline or the distillation or breaking up of the fatty acid, have been overcome by my process which will now be explained. While any suitable or appropriate form of apparatus can be employed for carrying on the process, one possible form of apparatus is shown by the diagrammatic figure on the accompanying drawing.

Referring to the drawing, the numeral 1 designates a wrought iron vertical still in which two hundred and eighty-four (284) parts of commercial stearic acid are placed. A second still 2 is also utilized, and one hundred and eighty-six (186) parts of commercial aniline oil are placed in this second still. While 93 parts of aniline is the theoretical quantity to combine with 284 parts of stearic acid to form stearanilide, as is obvious from the molecular weights of the compounds used, it is preferred to use an excess of aniline oil in order that all of the stearic acid may be converted into the anilide. The excess is not objectionable, of course, because the uncombined aniline vapor is recovered as explained hereinafter. A vapor pipe 3 leads from the top or dome of the second still 2 to the top of the first still 1, and extends downwardly through the still 1 to a point slightly spaced from the bottom thereof. The discharge end of the vapor pipe 3 thus extends downwardly below the surface of the stearic acid in the still 1. Each of the stills is provided with a thermometer 4, and some means such as a burner 5 is provided for heating each of the stills. The still 2 which contains aniline oil is heated to a temperature of from 182° C. to 189° C., while the still 1 containing the stearic acid is heated to a temperature of about 235° C., the most favorable working range of temperature being from 230° C. to 240° C., which is sufficiently high to cause the reaction to take place at a satisfactory rate, but not so high as to cause decomposition of the stearic acid.

The aniline oil in the still 2 is heated to the boiling point, and the vapors pass over into the heated stearic acid in the still 1. The reaction commences as soon as the aniline vapors begin to pass into the melted acid, providing the latter has been heated to the proper temperature, as indicated above.

A vapor pipe 6 leads from the still 1 to a condenser 7, and a suitable receptacle 8 is provided to receive the liquid discharged from the condenser. The water of formation along with any unattached aniline passes over through the condenser 7 and is collected in the receptacle 8. The unattached or uncombined aniline oil is thus recovered, so that it can be used in a subsequent operation.

The speed of the reaction is entirely dependent on the rapidity of distillation of the aniline oil, and at first practically all of the aniline vapors combine with the stearic acid, although as the operation continues the proportion of aniline oil carried over with the water of formation increases and the quantity of water going over decreases, the distillation being continued until no more water goes over, when the reaction is complete and all of the stearic acid has been converted into stearanilide. The aniline oil distillation is then discontinued, and the stearic acid still is heated until no more aniline oil appears at the discharge end of the condenser 7. This assures the removal of all excess of aniline oil from the product, and the result is a quantitative yield of stearanilide, which has been found to have a melting point of from 85° C. to 93° C., according to the purity of the products employed. The stills 1 and 2 each have an inlet 9 and an outlet 10, which are controlled in the usual manner by valves or cocks, so that they can be opened and closed as desired. The resulting yield of stearanilide can be drawn off from the still 1 through the outlet 10.

In the foregoing example I have used stearic acid, although it will be understood that other fatty acids, such as palmitic acid and arachidic acid can be employed. The product will be an anilide of the particular fatty acid that is used, and in my experiments I have found that these fatty anilides are non-saponifiable. These anilides although being derivatives of fatty acids, are entirely neutral bodies of hydrocarbon characteristics. Being non-saponifiable and neutral, the anilides will not have any corrosive action on metal, and can be used in lubricants or other substances coming into contact with metals without any of the objectionable results which are incident to the fatty acids themselves, the latter acting very readily upon metal surfaces as is well known. The anilides thus have a very decided advantage over fatty substances when used in lubricants, since they do not corrode the metal surfaces.

These anilides have a high melting point which is above 200° F., and only a small percentage of these anilides is required to solidify oils to the consistency of grease, and lubricating oils of any desired viscosity can be reduced to a semi-fluid or solid consistency. For example I find that by melting 10% of stearanilide with 90% of 28° Bé. paraffine oil a light colored transparent grease is obtained, and with 7% of stearanilide and 93% of cylinder oil a transparent greenish grease results. The former grease is suitable for bearings running at high speeds, and under light loads, while the latter grease is more suitable for use in bearings which run at low speeds under heavy loads, or for use in ordinary grease cups or high pressure lubricating systems. It will be understood that I do not limit the use of the anilide base to the percentages given in the foregoing examples, or to combination with the particular oils which have been mentioned, since the anilide base can be combined with many different kinds of oils and waxes, and in different proportions to produce products of different degrees of consistency and of varying characteristics. While stearanilide has been particularly mentioned as a base, other anilides can be used to accomplish the same or similar results, and I do not wish to be restricted to the use of stearanilide. The anilide base can be produced in any suitable manner, being the product of chemical reaction between aniline oil and one of the fatty acids.

The anilide which is produced by this process is an absolutely neutral product which has no outside reaction, and while the anilide may be used for any desired purpose, I have found that it is very valuable for solidifying or stiffening the consistency of oils. This is explained in my co-pending application, Serial No. 636,638, which was filed on May 4, 1923, and it will be understood that one of the advantages of using a neutral anilide is that a lubricant is produced which is non-saponifiable and free from acids, such as would tend to corrode and act in an objectionable manner upon any metal surfaces with which they were brought into contact.

For illustrative purposes one method of carrying out the process has been shown and described in detail, although it will be understood that many variations can be made in the minor details of the process without departing from the spirit of the invention and within the scope of the appended claims.

Having thus described my invention what I claim as new and desire to secure by Letters Patent is,

1. The method of producing an anilide which consists in distilling aniline oil, passing the vapors from the distilled aniline oil through stearic acid which is heated to approximately 235° C., and collecting and condensing the uncombined aniline oil vapors.

2. The method of producing stearanilide which consists in distilling aniline oil at a temperature of approximately 185° C. and passing the vapors therefrom through stearic acid which is heated to approximately 235° C.

3. The method of producing an anilide which consists in distilling aniline oil, passing the vapors from the distilled aniline oil through a fatty acid which is heated to a temperature above that which is necessary to distill the aniline, and sufficiently high to cause the reaction between the fatty acid and the aniline to form an anilide of the fatty acid, the passage of the aniline oil vapor through the fatty acid being continued until no water of formation is given off, and then maintaining the temperature in the anilide until all of the uncombined aniline oil has been given off.

4. The method of producing stearanilide which consists in distilling aniline oil at a temperature of about 185° C., passing the aniline oil vapors through stearic acid which is heated to approximately 235° C., collecting and condensing the water of formation and uncombined aniline oil vapor which is driven off from the stearic acid, so that the uncombined aniline oil can be subsequently utilized, the passage of the aniline oil vapors through the stearic acid being continued until no water of formation is driven off, and then maintaining the temperature in the anilide until all of the uncombined aniline oil has been driven off.

5. The method of producing an anilide of a fatty acid which consists in distilling aniline, passing the vapors from the distilled aniline through a fatty acid which is heated to a temperature above that which is necessary to distill the aniline, and sufficiently high to cause the reaction between the fatty acid and the aniline to form an anilide of the fatty acid.

In testimony whereof I affix my signature.

EDWARD A. NILL.